United States Patent Office 3,112,306
Patented Nov. 26, 1963

3,112,306
16β - MERCAPTO-17β-HYDROXY-2-ANDROSTEN-3-ONE 16,17-CYCLIC ACETALS AND INTERMEDIATES THEREOF
Kenichi Takeda, Hyogo Prefecture, and Taichiro Komeno, Osaka, Japan, assignors to Shionogi & Co., Ltd., Osakashi, Japan
No Drawing. Filed Apr. 12, 1962, Ser. No. 187,462
Claims priority, application Japan Oct. 3, 1959
9 Claims. (Cl. 260—239.55)

The present invention relates to steroidal cyclic acetals and intermediates thereof, and more particularly to 16β-mercapto-17β-hydroxy - 4 - androstene-3-one 16,17-cyclic acetals and intermediates thereof.

The 16β-mercapto-17β-hydroxy-4-androstene-3-one 16,17-cyclic acetals, according to the present invention, correspond to the formula:

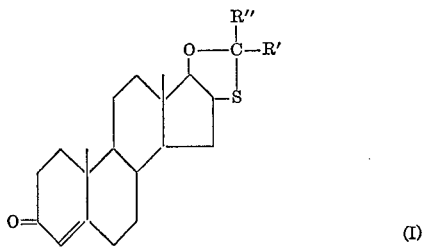

(I)

wherein R' and R" are each hydrogen, alkyl aryl, alkaryl or aralkyl (preferably a member selected from the group consisting of hydrogen, a lower alkyl having 1 to 5 carbon atoms such as methyl, ethyl, propyl and butyl, phenyl, tolyl and benzyl) and, when linked together, represent a cyclic alkyl (preferably cyclohexyl).

The $\Delta^4$-3-oxo cyclic acetal I is a form of synthetic antigonadotropic agent and can be produced from 3β-hydroxy-16α,17α-epoxy-5(6)-pregnene-20-one or its 3-acylates, which are known and can be prepared from pregnenolone, according to the method of the present invention.

Accordingly, a primary object of the present invention is to provide a utilization method for the said known steroid, pregnenolone. Another object of the present invention is to provide a synthetic method for the preparation of antigonadotropic agents. Another object of the invention is to provide $\Delta^4$-3-oxo cyclic acetals, corresponding to Formula I, intermediates therefor and processes for their preparation.

The method of the present invention can be substantially illustrated by the following scheme:

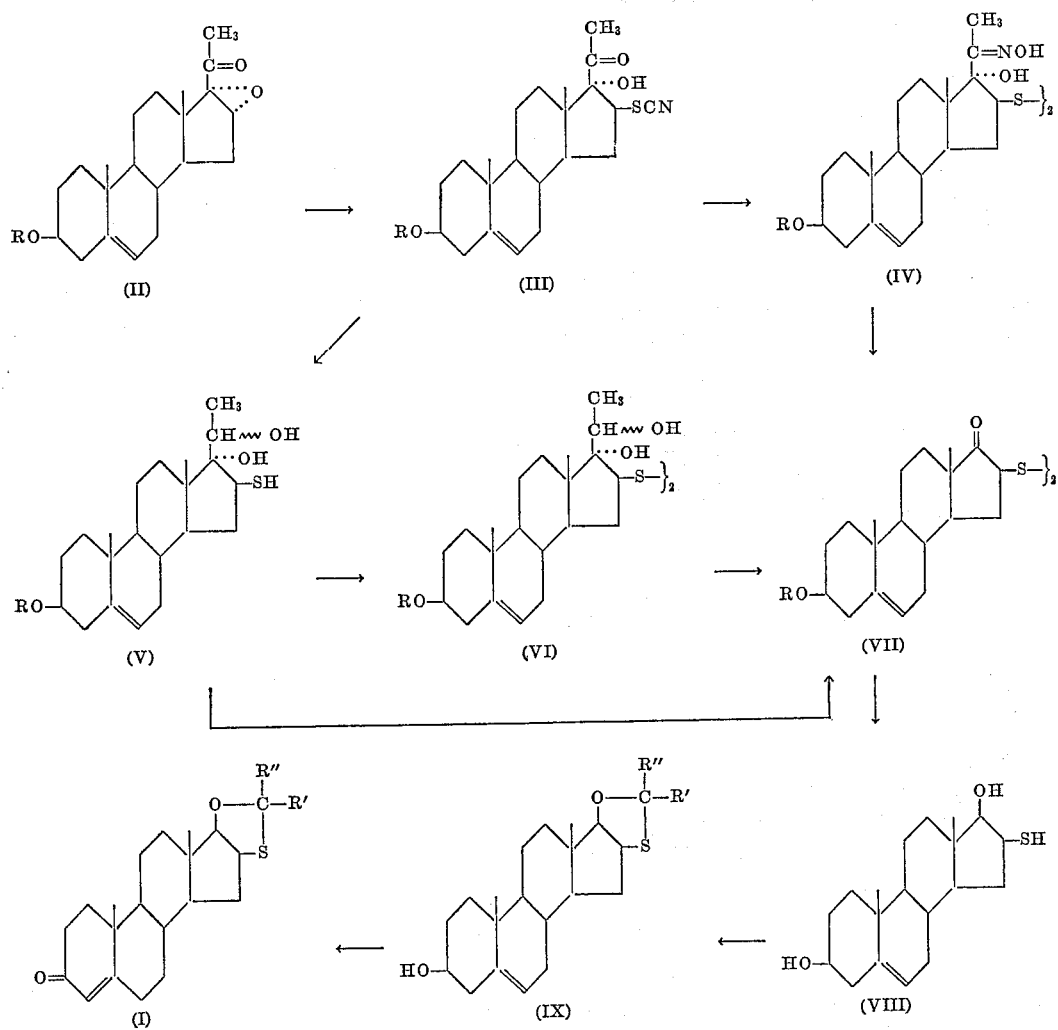

wherein R is hydrogen or a lower alkylcarbonyl, of which the alkyl moiety has 1 to 10 carbon atoms, such as formyl, acetyl, propionyl, butyryl, valeryl, octanoyl and decanoyl, R' and R" have each the same significance as designated above and the ripple mark represents an undetermined configuration. The scheme should be understood as showing the substantial conversion; e.g. the acyl radical at 3-position in some compounds shown therein may be changed to the hydroxyl radical in the course of the reaction in some steps. However, the resulting hydroxyl compounds can be easily changed into the corresponding acyl compounds by a conventional esterification procedure.

Pregnenolone is available in quantity from soya sterols, and it can be readily converted into 3β-hydroxy-16α,17α-epoxy-5(6)-pregnene-20-one or its 3-acylates according to a conventional manner [P. L. Julian et al., J. Am. Chem. Soc., 72, 5145 (1950)].

In the present invention, 3β-hydroxy-16α,17α-epoxy-5(6)-pregnene-20-one or its 3-acylates, corresponding to Formula II, are used as the starting material. Firstly, the epoxide II is subjected to fission of the epoxy bond with thiocyanic acid to afford the thiocyanatohydrin III. The reaction may be preferably carried out by heating the epoxide II with an alkali metal salt of thiocyanic acid (e.g. potassium thiocyanate) in an acid (e.g. acetic acid) on a steam bath.

Secondly, the resultant thiocyanatohydrin III is subjected to oxime formation at 20-position, followed with Beckmann rearrangement to the ketodisulfide VII. The oxime formation may be carried out by reacting the thiocyanatohydrin III with hydroxylamine by the usual method. As the result of the reaction, the oxime disulfide IV is obtained as a mixture with the thiol oxime corresponding to the formula:

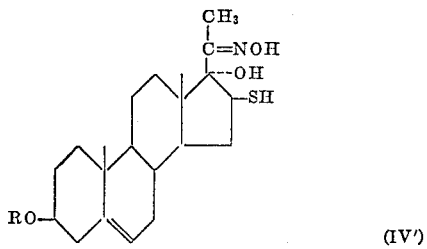

(IV')

wherein R has the same significance as designated above. The mixture may be subjected to Beckmann rearrangement without previous separation into each component. Thus, the mixture may be treated with a reagent usually employed in Beckmann rearrangement (e.g. phosphorus pentachloride, phosphorus oxychloride, acetic anhydride and acetic acid) in a suitable solvent (e.g. pyridine). The resulting product is a mixture of the ketodisulfide VII and the isothiazoline corresponding to the formula:

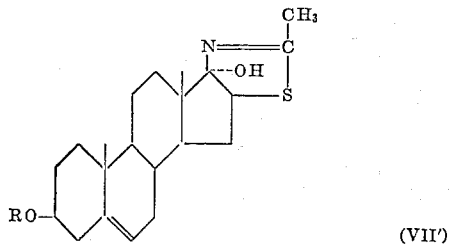

(VII')

wherein R has the same significance as designated above, which can be readily separated to each component by a usual method (e.g. fractional crystallization, chromatography).

Alternatively, the thiocyanatohydrin III may be subjected to reduction, followed with oxidative elimination of the side chain at 17-position to give the ketodisulfide VII. The reduction may be carried out by treating the thiocyanatohydrin III with a reducing agent usually employed in the conversion of a carbonyl radical to a hydroxyl radical (e.g. lithium aluminum hydride). The resulting thiol V may be subjected to oxidative elimination with or without previous conversion into the disulfide VI. Although the previous conversion is not requisite, it is preferred in view of the protection of the mercapto radical at 16-position readily affected by the oxidizing agent employed in the subsequent oxidative elimination. For the conversion of the thiol V into the disulfide VI, the former may be treated with a weak oxidizing agent (e.g. iodine) in a suitable solvent (e.g. methanol, ethanol). The oxidative elimination may be carried out by treating the thiol V or the disulfide VI with a strong oxidizing agent (e.g. lead tetraacetate, periodic acid, osmium tetroxide) in a suitable solvent (e.g. dioxane, tetrahydrofuran).

Thirdly, thus-obtained ketodisulfide VII is subjected to the reduction to afford the hydroxythiol VIII. The reaction may be carried by treating the ketodisulfide with a reducing agent usually employed in the conversion of a carbonyl radical into a hydroxyl radical (e.g. lithium aluminum hydride) in a suitable solvent (e.g. ether, tetrahydrofuran).

Fourthly, the resulting hydroxythiol VIII is subjected to the cyclic acetal formation between 16 and 17-positions. The reaction may be performed by treating the hydroxythiol VIII with a carbonyl compound such as aldehydes and ketones (e.g. acetaldehyde, propionaldehyde, butyraldehyde, benzaldehyde, acetone, methyl ethyl ketone, diethyl ketone, methyl butyl ketone, dipropyl ketone, dibutyl ketone, cyclohexanone, benzophenone) in the presence of an acidic catalyst (e.g. p-toluenesulfonic acid, sulfuric acid).

Fifthly, the thus-prepared cyclic acetal IX is subjected to oxidation at 3-position to obtain the final product, $\Delta^4$-3-oxo cyclic acetal I. The reaction may be carried out by treating the cyclic acetal IX with an aluminum alkoxide (e.g. aluminum iso-propoxide, aluminum isobutoxide, aluminum t-butoxide) and a ketone (e.g. acetone, cyclohexanone), if necessary, in a suitable solvent (e.g. benzene, toluene).

Although the method of the present invention is hereinbefore illustrated step by step, these steps may be executed successively without the isolation of the product each step, especially when the prepared intermediate is not stable. For instance, the hydroxylthiol VIII is relatively unstable and is preferably subjected to the reaction in the subsequent step without its isolation from the reaction mixture.

The final products of the present invention, 16β-mercapto-17β-hydroxy-4-androstene-3-one 16,17-cyclic acetals of formula I, are synthetic antigonadotropic agents. When orally administered to mice (body weight, 15 to 17 grams; 40 days old) at the dose of 1 milligram, 16β-mercapto - 17β-hydroxy-4-androstene-3-one 16,17-acetonide of formula I wherein R' and R" are each methyl, for instance, showed an antigonadotropic activity with the inhibiting ratio of 81.82 percent approximately equal to that (86.62 percent) of the heretofore known antigonadotropic steroid, 17α - ethinyl - 19 - nortestosterone. The other products also show the similar activity.

Thus, the process involved in the present invention has significant utility with respect to the synthesis of physiologically active steroids, and the thus-obtained products are also useful antigonadotropic agents or intermediates thereof.

The following examples represent presently-preferred embodiments of the present invention, but it is to be understood that the examples are given by way of illustration only and not of limitation. The abbreviations used in these examples are intended to have the following meanings: g., grams(s); mg., milligram(s); ml., millilitre(s); ° C., degrees centigrade; and M.P.., melting point. Other abbreviations have each a conventional meaning.

EXAMPLE 1

*Preparation of 3β,17α-Dihydroxy-16β-Thiocyanato-5(6)-Pregnene-20-One*

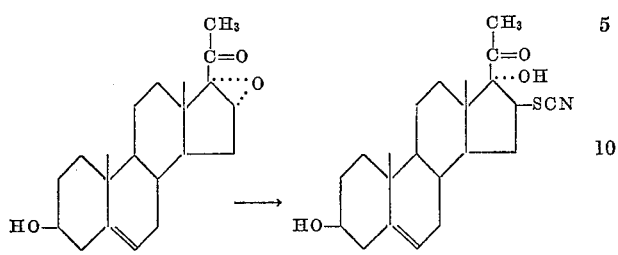

A solution of 3β-hydroxy-16α,17α-epoxy-5(6)-pregnene-20-one (2 g.) and potassium thiocyanate (8 g.) in acetic acid (60 ml.) is heated on a steam bath for 5 hours, poured into water, and extracted with chloroform. The chloroform layer is washed with water, sodium carbonate solution, and water, dried over anhydrous sodium sulfate, and evaporated to dryness. The residue is crystallized from ether and recrystallized twice from acetone to afford a mixture of 70 percent of 3β,17α-dihydroxy-16β-thiocyanato-5(6)-pregnene-20-one and 30 percent of the parent epoxide, 3β - hydroxy - 16α-17α-epoxy-5(6)-pregnene-20-one, as needles (1.2 g.). M.P., 218 to 220° C.

*Analysis.*—Calcd. for A30% $C_{21}H_{30}O_3$+70%

$C_{22}H_{31}O_3NS$)

C, 70.38; H, 8.51; N, 2.52; S, 5.76. Found: C, 70.23; H, 8.43; N, 2.50; S, 5.93.

I.R. $\nu_{max}^{Nujol}$ cm.$^{-1}$: 3587, 3562, 3302 (OH), 2176 (SCN), 1696 (C=O)

EXAMPLE 2

*Preparation of 3β,17α-Dihydroxy-16β-Thiocyanato-5(6)-Pregnene-20-One 3-Acetate*

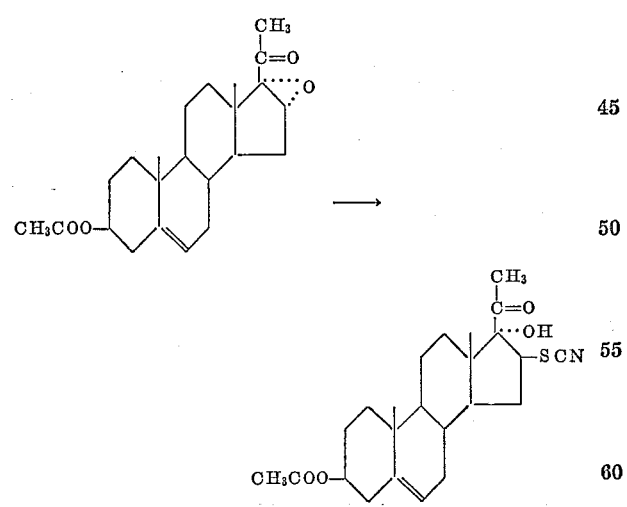

A solution of 3β-hydroxy-16α,17α-epoxy-5(6)-pregnene-20-one 3-acetate (5 g.) and potassium thiocyanate (20 g.) in acetic acid (150 ml.) is heated on a steam bath for 6 hours. After evaporation of acetic acid under a reduced pressure, the residue is mixed with a large amount of water and then shaken with ether-chloroform. The ether-chloroform layer is washed with water to neutrality and then dried. Removal of the solvent affords the residue which is treated with ether to give crude crystals (3.9 g.). The crude crystals are recrystallized from acetone-hexane to give 3β,17α-dihydroxy-16β-thiocyanato-5(6)-pregnene-20-one 3-acetate as pure crystals. M.P. 180° C. and 208 to 210° C. (decomp.).

*Analysis.*—Calcd. for $C_{24}H_{33}O_4SN$: C, 66.79; H, 7.71; S, 7.43; N, 3.25: Found: C, 67.25; H, 7.85; S, 7.43; N, 3.23.

I.R. $\nu_{max}^{Nujol}$ cm.$^{-1}$: 3478 (OH), 2152 (SCN), 1735, 1241 ($CH_3COO$), 1711 (C=O)

EXAMPLE 3

*Preparation of 16β,16β'-Bis-[3β-Acetoxy-17α-Hydroxy-20-Hydroxyimino-5(6)-Pregnene]Disulfide*

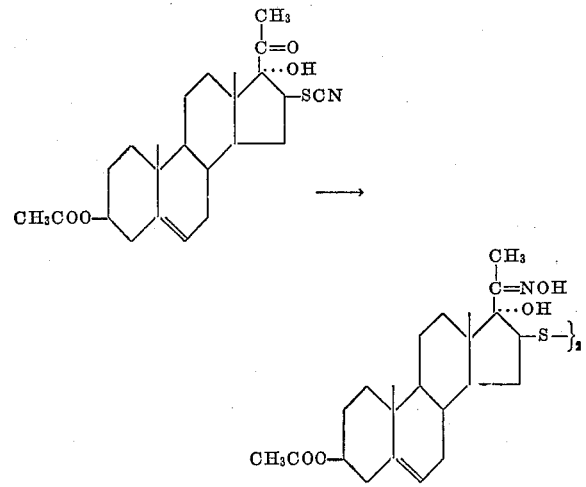

To a hot solution of 3β,17α-dihydroxy-16β-thiocyanato-5(6)-pregnene-20-one 3-acetate (3.5 g.) in ethanol (50 ml.), there is added a solution of hydroxylamine hydrochloride (3.0 g.) and sodium acetate (3.6 g.) in water (25 ml.), and the resulting mixture is heated on a steam bath until in complete solution and then allowed to stand overnight at room temperature (15 to 20° C.). The reaction mixture is concentrated and the precipitate is collected by filtration, washed with 50 percent ethanol, and recrystallized from ethanol-water to afford a mixture of 16β,16β' - bis - [3β - acetoxy - 17α - hydroxy - 20 - hydroxyimino-5(6)-pregnene] disulfide and 3β-hydroxy-16β - mercapto - 17α - hydroxy - 20 - hydroxyimino - 5(6)-pregnene 3-acetate as silky needles (2.5 g.). M.P., 218 to 220° C. $[\alpha]_D^{27}$ −25.1°±4° (c.=0.506, chloroform).

*Analysis.*—Calcd. for $C_{23}H_{35}O_4SN \cdot \tfrac{1}{2}H_2O$: C, 64.15; H, 8.45; S, 7.45; N, 3.25. Calcd. for $(C_{23}H_{34}O_4SN)_2 \cdot H_2O$: C, 64.30; H, 8.21; S, 7.46; N, 3.26. Found: C, 63.79; H, 8.11; S 7.35; N, 3.59.

U.V.: $\lambda_{max}^{ethanol}$ 281 mμ (ε, 700). I.R. $\nu_{max}^{Nujol}$ cm.$^{-1}$: 3409, 3321, 3239 (OH), 1732, 1707, 1274, 1242 ($CH_3COO$), 1634 (C=N)

EXAMPLE 4

*Preparation of 16β,16β'-Bis-[3β-Acetoxy-17-Oxo-5(6)-Androstene] Disulfide*

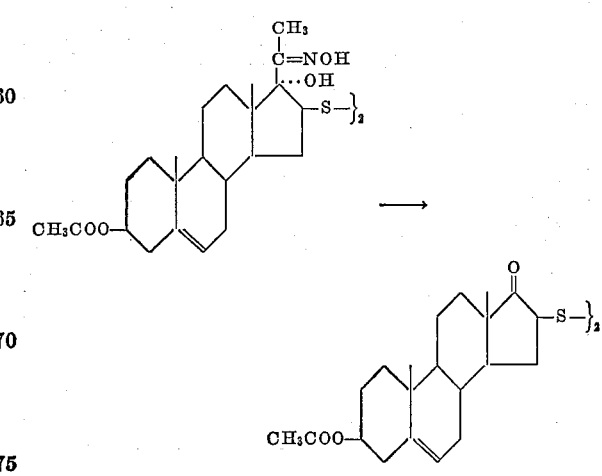

The mixture of 16β,16β'-bis-[3β-acetoxy-17α-hydroxy-20-hydroxyimino-5(6)-pregnene] disulfide and 3β-hydroxy - 16β - mercapto - 17α - hydroxy - 20 - hydroxyimino-5(6)-pregnene 3-acetate (2.5 g.), prepared in Example 3, is dissolved into pyridine (11 ml.). To the resultant solution, there is added dropwise a solution of phosphorus oxychloride (1.8 ml.) in pyridine (5.4 ml.) with stirring while ice-cooling. After stirring with cooling for 2 hours, ice is added to the reaction mixture and the precipitate is collected by filtration. The thus-obtained crude crystals are recrystallized from methanol and further from acetone to afford 16β,16β'-bis-[3β-acetoxy-17-oxo-5(6)-androstene] disulfide as leaflets (450 mg.). M.P., 258 to 260° C. (decomp.). $[\alpha]_D^{26}$ +83.6°±4° (c.=0.578, dioxane).

Analysis.—Calcd. for $(C_{21}H_{29}O_3S)_2$: C, 69.77; H, 8.09; S, 8.87. Found: C, 70.14; H, 8.18; S, 8.70.

U.V. $\lambda_{max.}^{dioxane}$ 315 mμ (ε, 470). I.R. $\nu_{max.}^{Nujol}$ cm.$^{-1}$: 1734, 1233 (CH₃COO), 1743 (C=O). $\nu_{max.}^{chloroform}$ cm.$^{-1}$: 1727, 1735 (sh.)

EXAMPLE 5

Preparation of 3β,17α,20ξ-Trihydroxy-16β-Mercapto-5(6)-Pregnene

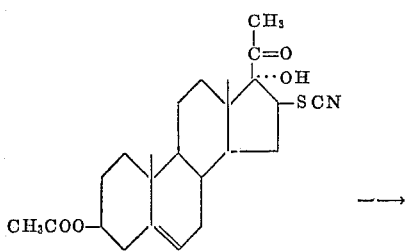

A solution of 3β,17α-dihydroxy-16β-thiocyanato-5(6)-pregnene-20-one 3-acetate (3.0 g.) in a mixture of tetrahydrofuran (50 ml.) and anhydrous ether (20 ml.) is added with stirring to a suspension of lithium aluminum hydride (800 mg.) in anhydrous ether (70 ml.) over a period of 20 minutes. After agitation for 10 minutes, the mixture is heated for 1 hour while refluxing. After adding ice and dilute hydrochloric acid to the reaction mixture, the resulting mixture is extracted with ether-chloroform (4:1). Evaporating the solvent, the residue is crystallized from methanol-water, acetone and then ethyl acetate to afford 3β,17α,20ξ-trihydroxy-16β-mercapto-5(6)-pregnene as crystals (1.27 g.). M.P., 191 to 194° C.

Analysis.—Calcd. for $C_{21}H_{34}O_3S \cdot \frac{1}{2}C_4H_8O_2$: C, 67.28; H, 9.33; S, 7.81. Found: C, 67.30; H, 9.50; S, 7.47.

Acetylation of 3β,17α,20ξ-trihydroxy-16β-mercapto-5(6)-pregnene with pyridine and acetic anhydride according to the usual method, followed with recovery of the product by chromatography on Florisil (activated magnesium silicate) using benzene-ether as a eluating solvent and crystallization of the eluate from ether and then methanol, affords 3β,17α,20ξ-trihydroxy-16β-mercapto-5(6)-pregnene 3,16,20-triacetate as needles. M.P., 187 to 189° C.

Analysis.—Calcd. for $C_{27}H_{40}O_6S$: C, 65.82; H, 8.18; S, 6.51. Found: C, 65.57; H, 8.11; S, 6.38.

EXAMPLE 6

Preparation of 16β,16β'-Bis-[3β,17α,20ξ-Trihydroxy-5(6)-Pregnene] Disulfide

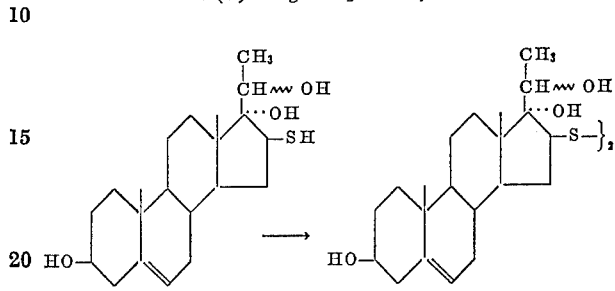

To a solution of 3β,17α,20ξ-trihydroxy-16β-mercapto-5(6)-pregnene (720 mg.) in methanol (10 ml.), there is added iodine (250 mg.) with stirring at a room temperature (15 to 20° C.). The reaction mixture slowly decolorizes and crystals appear. After agitation for 1 hour, the crystals are collected by filtration, and washed with methanol. Then, the crystals are further recrystallized from chloroform-methanol to afford 16β,16β'-bis-[3β,17α,20ξ-trihydroxy-5(6)-pregnene] disulfide as pure crystals (590 mg.). M.P., 280 to 282° C. (decomp.).

Analysis.—Calcd. for $(C_{21}H_{33}O_3S)_2 \cdot 2CH_4O$: C, 66.46; H, 9.38; S, 8.06. Found: C, 66.75; H, 9.18; S, 8.48.

EXAMPLE 7

Preparation of 16β,16β'-Bis-[3β-Acetoxy-17-Oxo-5(6)-Androstene] Disulfide

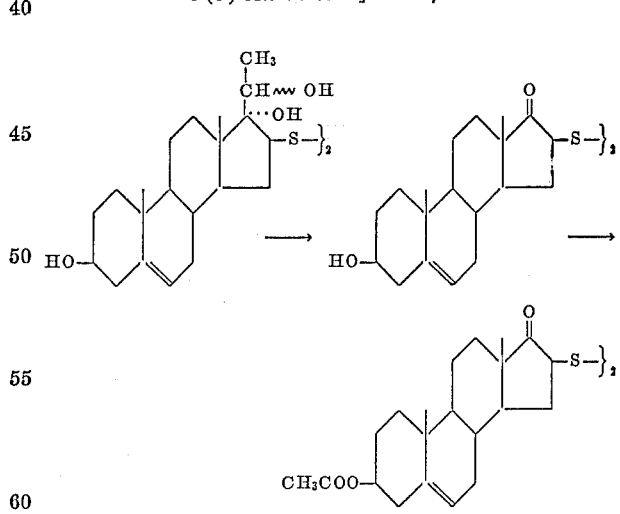

To a solution of 16β-16β'-bis-[3β,17α,20ξ-trihydroxy-5(6)-pregnene] disulfide (330 mg.) in dioxane (15 ml.), there is added a solution of periodic acid (530 mg.) in water (0.5 ml.), and the resultant mixture is agitated at a room temperature (15 to 20° C.) for 2 hours. To the reaction mixture, there is added water, and the precipitated crystals are collected by filtration. The crystals are subjected to acetylation with pyridine and acetic anhydride according to the usual method, and the resultant product is crystallized from chloroform-methanol to afford 16β,16β'-bis-[3β-acetoxy-17-oxo-5(6)-androstene] disulfide as crystals (100 mg.). M.P. 258 to 260° C. (decomp.).

EXAMPLE 8

*Preparation of 3β,17β-Dihydroxy-16β-Mercapto-5(6)-Androstene*

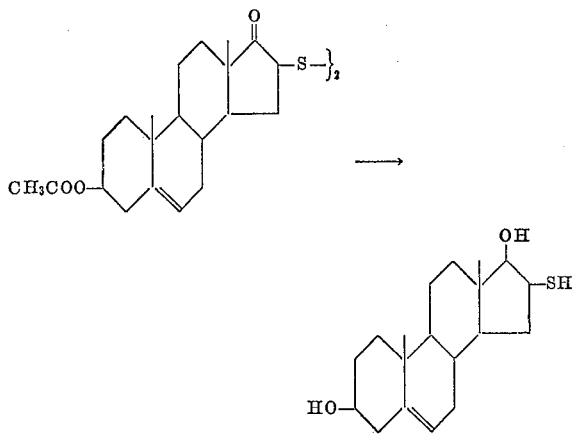

16β,16β'-bis-[3β-acetoxy-17-oxo-5(6)-androstene] disulfide (100 g.) is reduced with lithium aluminum hydride (60 mg.) in a mixture of tetrahydrofuran (10 ml.) and anhydrous ether (10 ml.) in the same manner as in Example 5 to afford 3β,17β-dihydroxy-16β-mercapto-5(6)-androstene, which is subjected to acetylation with pyridine and acetic anhydride, followed with recrystallization from acetone-methanol to give 3β,17β-dihydroxy-16β-mercapto-5(6)-androstene 3,16,17-triacetate as crystals (30 mg.). M.P., 220 to 222° C.

*Analysis.*—Calcd. for $C_{25}H_{36}O_5S$: C, 66.93; H, 8.09; S, 7.15. Found: C, 67.11; H, 7.99; S, 6.91.

EXAMPLE 9

*Preparation of 3β,17β-Dihydroxy-16β-Mercapto-5(6)-Androstene 16,17-Acetonide*

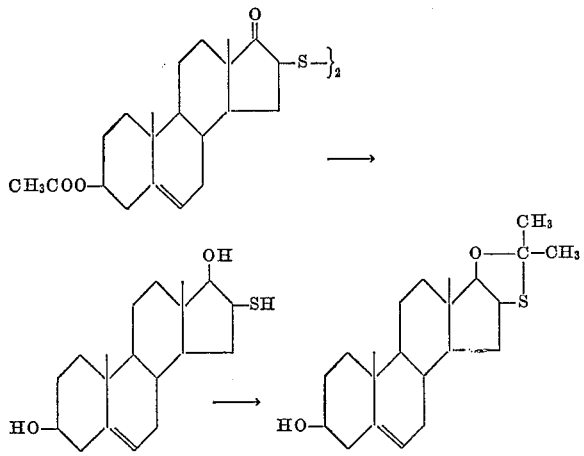

16β,16β'-bis-[3β-acetoxy-17-oxo-5(6)-androstene] disulfide (2.722 g.) is reduced with lithium aluminum hydride (1.43 g.) in a mixture of tetrahydrofuran (160 ml.) and anhydrous ether (80 ml.) for 1.5 hours in the same manner as in Example 5. The resulting crude 3β,17β-dihydroxy-16β-mercapto-5(6)-androstene. (2.415 g.) is dissolved with p-toluenesulfonic acid (270 mg.) in acetone (100 ml.), and the resultant solution is heated for 8 hours while refluxing. The mixture is diluted with water and extracted with chloroform. The chloroform layer is washed with sodium carbonate solution and water, dried over anhydrous sodium sulfate, and evaporated to dryness. The residue is crystallized from acetone and further recrystallized from chloroform-methanol to afford 3β,17β-dihydroxy-16β-mercapto-5(6)-androstene 16,17-acetonide as plates (1.259 g.). M.P. 214 to 216° C. $[\alpha]_D^{29.5}$ —90.7°±3° (c.=0.795, chloroform).

*Analysis.*—Calcd. for $C_{22}H_{34}O_2S$: C, 72.88; H, 9.45; S, 8.84. Found: C, 73.11; H, 9.55; S, 8.78.

I.R. $\nu_{max.}^{Nujol}$ cm.$^{-1}$: 3380 (OH), 1376, 1364 (C(CH$_3$)$_2$)

The crude 3β,17β-dihydroxy-16β-mercapto-5(6)-androstene (549 mg.) intermediarily produced as above is dissolved in a mixture of acetone (30 ml.) and conc. sulfuric acid (0.3 ml.), and the resulting solution is allowed to stand overnight at a room temperature (15 to 20° C.) and then treated as above. The product is recrystallized from chloroform-methanol to afford 3β,17β-dihydroxy-16β-mercapto-5(6)-androstene 16,17-acetonide as plates (270 mg.). M.P., 214 to 216° C.

EXAMPLE 10

*Preparation of 16β-Mercapto-17β-Hydroxy-4-Androstene-3-One 16,17-Acetonide*

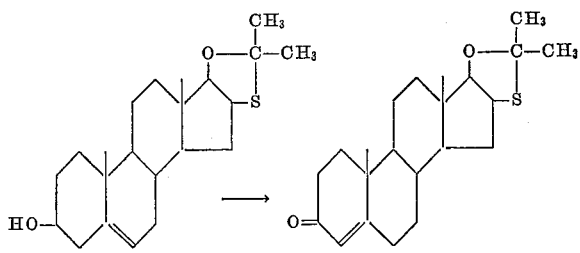

3β,17β-dihydroxy-16β-mercapto-5(6)-androstene 16,17-acetonide (90 mg.) is dissolved in a mixture of toluene (10 ml.) and cyclohexanone (1 ml.), and the resultant solution is added to aluminum iso-propoxide (200 mg.). The resulting mixture is heated for 8 hours while refluxing, and then treated according to the usual method. The product is chromatographed on alumina (3 g.). The eluates of petroleum ether-benzene (1:1) and benzene are crystallized from methanol to afford 16β-mercapto-17β-hydroxy-4-androstene-3-one 16,17-acetonide as leaflets (40 mg.). M.P., 219 to 224° C. $[\alpha]_D^{29.5}$+87.1°±3° (c.=0.897, chloroform).

*Analysis.*—Calcd. for $C_{22}H_{32}O_2S$: C, 73.29; H, 8.95; S, 8.89. Found: C, 73.16; H, 9.00; S, 9.01.

U.V.: $\lambda_{max.}^{ethanol}$ 241 mμ (ε, 16,740). I.R. $\nu_{max.}^{Nujol}$ cm.$^{-1}$: 1680, 1616 (Δ$^4$-3-oxo), 1379, 1366 (C(CH$_3$)$_2$)

Some of the other Δ$^4$-3-oxo cyclic acetals prepared in the similar manner as above are exampled as follows: 16β-mercapto-17β-hydroxy-4-androstene-3-one diethyl ketone 16,17-cyclic acetal (M.P., 144 to 146° C.), 16β-mercapto-17β-hydroxy-4-androstene-3-one benzaldehyde 16,17-cyclic acetal (M.P., 171 to 173° C. and 180° C.), 16β-mercapto-17β-hydroxy-4-androstene-3-one cyclohexanone 16,17-cyclic acetal (M.P., 185 to 187° C. (decomp.)), etc.

This is a continuation-in-part application of the application Serial No. 37,050, filed on June 20, 1960 (abandoned since the filing of the present application).

What is claimed is:
1. A compound of the formula:

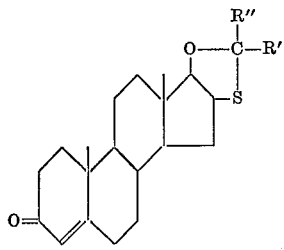

wherein R' and R" are each a member selected from the group consisting of hydrogen, a lower alkyl having from 1 to 5 carbon atoms and phenyl and, when linked together, represent cyclohexyl, only one of R' and R" being phenyl at any one time.

2. 16β - mercapto - 17β - hydroxy - 4 - androstene-3-one 16,17-acetonide.

3. 16β - mercapto - 17β - hydroxy - 4 - androstene-3-one diethyl ketone 16,17-cyclic acetal.

4. 16β - mercapto - 17β - hydroxy - 4 - androstene-3-one benzaldehyde 16,17-cyclic acetal.

5. 16β - mercapto - 17β - hydroxy - 4 - androstene-3-one cyclohexanone 16,17-cyclic acetal.

6. A compound of the formula:

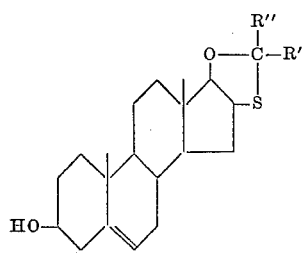

wherein R' and R" are each a member selected from the group consisting of hydrogen, a lower alkyl having from 1 to 5 carbon atoms and phenyl and, when linked together, represent cyclohexyl, only one of R' and R" being phenyl at any one time.

7. 3β,17β-dihydroxy-16β-mercapto-5(6)-androstene.

8. A compound of the formula:

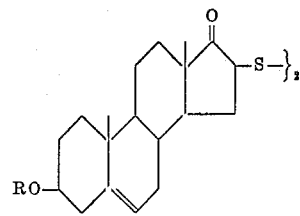

wherein R is a member selected from the group consisting of hydrogen and alkylcarbonyl, the alkyl moiety of the latter containing from 1 to 10 carbon atoms.

9. A compound of the formula:

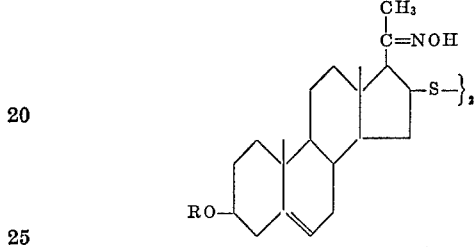

wherein R is a member selected from the group consisting of hydrogen and alkylcarbonyl, the alkyl moiety of the latter containing from 1 to 10 carbon atoms.

References Cited in the file of this patent
UNITED STATES PATENTS 2,982,777     Loechel et al. _____ May 2, 1961